Oct. 4, 1955 R. E. REASON 2,719,947

RECORDING APPARATUS

Filed Feb. 6, 1950 3 Sheets-Sheet 1

*Inventor*

RICHARD E. REASON

By Emery Holcombe & Blair

*Attorneys*

Oct. 4, 1955 R. E. REASON 2,719,947

RECORDING APPARATUS

Filed Feb. 6, 1950 3 Sheets-Sheet 2

Inventor

RICHARD E. REASON

By Emery Holcombe & Blair

Attorneys

Inventor
RICHARD E. REASON
By Emery Holcombe & Blair
Attorneys

United States Patent Office 2,719,947

Patented Oct. 4, 1955

2,719,947

RECORDING APPARATUS

Richard Edmund Reason, Leicester, England, assignor to Taylor, Taylor & Hobson Limited, Leicester, England, a company of Great Britain Application February 6, 1950, Serial No. 142,557

Claims priority, application Great Britain February 7, 1949

5 Claims. (Cl. 346—112)

This invention relates to recording apparatus of the type comprising a pen unit whose pen or other marker is oscillated about a main pivot (hereinafter referred to as "the main axis of oscillation") in accordance with one of two coordinates to be recorded on a flexible chart, and means whereby the chart is moved through a guide or gate relatively to the pen in accordance with the other coordinate and in a direction approximately parallel to the main axis of oscillation.

In recording apparatus according to the present invention the guide or gate comprises two cooperating, and mutually separable, elements one of which is associated with a base portion whilst the second guide element and the pen unit are movable towards and away from the base portion and first guide element. The apparatus may be contained within a housing comprising a body or base portion and a cooperating lid or cover, and arranged so that on opening the lid or cover the guide or gate is simultaneously opened so as to provide ready access for loading, unloading, maintenance and inspection.

These and other features according to the invention will be apparent from the following description, appended claims and accompanying drawings which show an embodiment of the invention by way of example.

Figure 1:
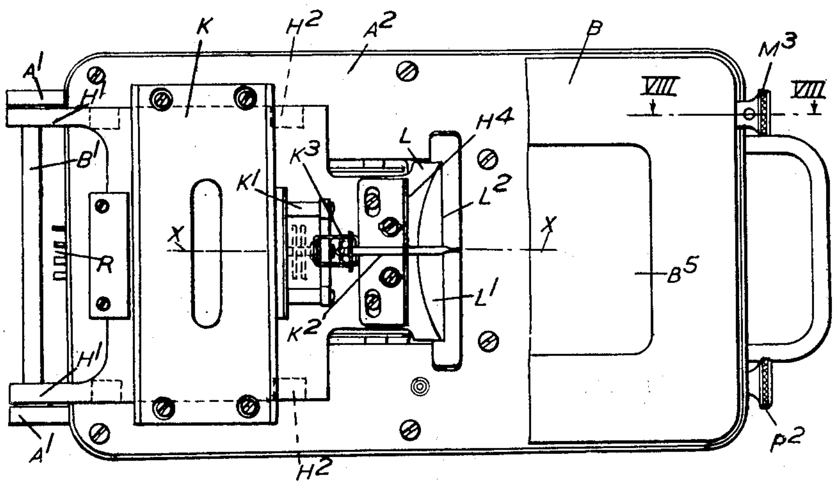
Figure 1 shows the apparatus in plan with part of the lid cut away.
Figure 2:
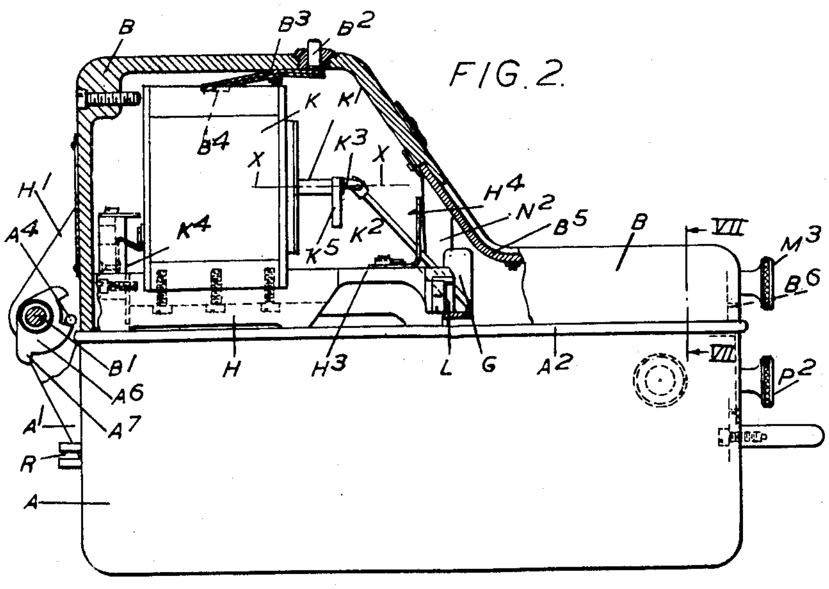
Figure 2 is a side elevation with part of the lid in section.
Figure 3:
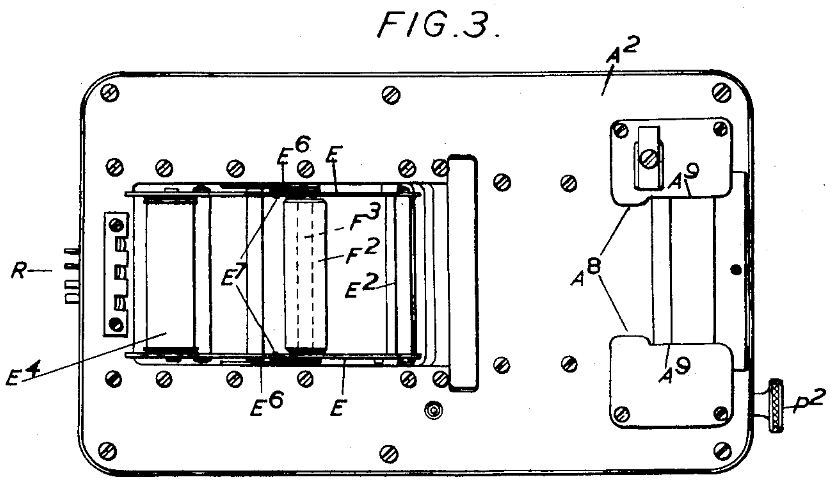
Figure 4:
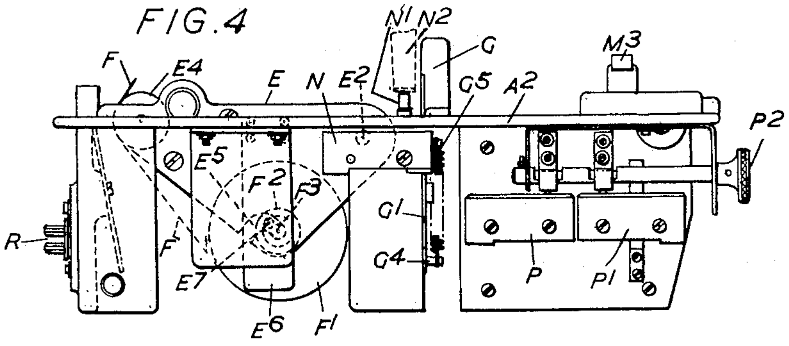
Figure 5:
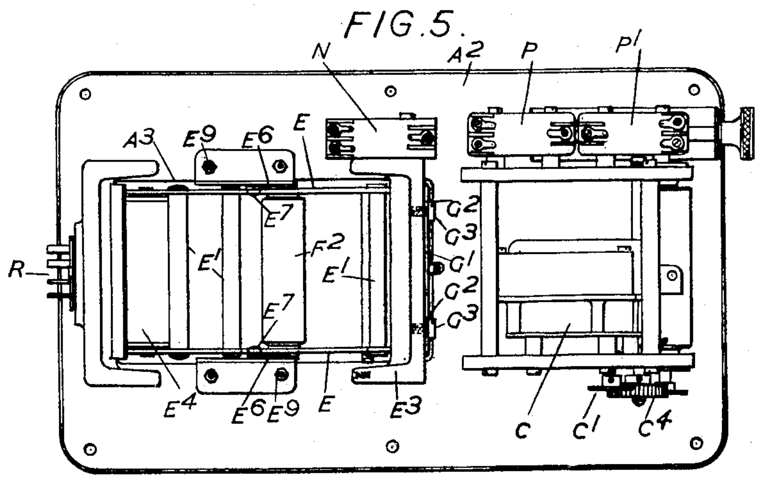
Figure 6:
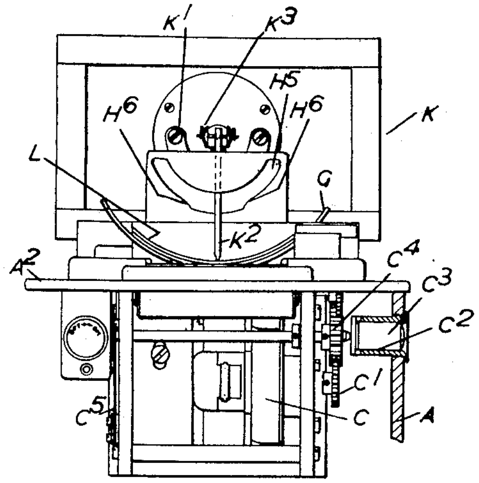
Figure 7:
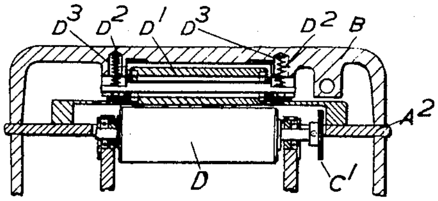
Figure 8:
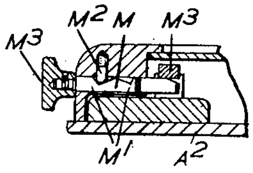
Figure 9:
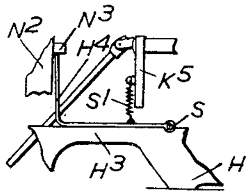
Figure 10:
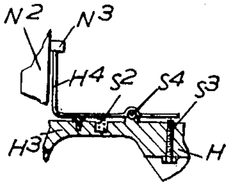

Figure 3 shows the apparatus in plan with the lid, pen unit and bottom casing removed, Figure 4 is a side elevation of Figure 3, Figure 5 is a bottom plan of Figure 4, Figure 6 shows the pen unit in end elevation as viewed from left to right in Figure 1, Figure 7 is a section on the line VII—VII of Figure 2, Figure 8 is a section on the line VIII—VIII of Figure 1, and Figures 9 and 10 show two modifications of the arrangement shown in Figure 2.

In the construction shown in the drawings the apparatus comprises a body portion or base A and a cooperating lid or cover B hinged to the body portion A by a transverse rod or hinge pin $B^1$ cooperating with bearings formed in two laterally spaced lugs $A^1$ at one end of the base A. The hinge pin $B^1$ may be employed as a handle for carrying the apparatus. Arranged within the base A at that end thereof remote from the hinge pin $B^1$ is an electric clock motor C from which the drive is transmitted through a reduction gear $C^1$ to a friction feed roller D, an idler roller $D^1$ carried by the lid B being urged towards the upper surface of the friction feed roller D by springs $D^2$ arranged in vertical recesses $D^3$ formed in the lid B. In order to release the roller D, for the purpose described below, the casing A is provided with a bushing $C^2$ containing a press button $C^3$ whereby one of the intermediate gears $C^4$ can be axially moved against a spring $C^5$ out of driving engagement with the feed roller D.

Disposed within the base A is a support for a supply roll comprising two triangular trunnion plates E interconnected by spacers $E^1$ so as to form a frame which is pivotally connected at $E^2$ to a bracket $E^3$ secured to the under-side of a cover plate $A^2$ which forms the top part of and closes the base A. The pivoted frame E, $E^1$ carries a guide roller $E^4$ over which a flexible chart F, in the form of a strip of paper, passes from a supply roll $F^1$ carried between the trunnion plates E. Each of the plates E has a bayonet slot $E^5$ so that the trunnions $F^3$ of a spindle $F^2$ carrying the supply roll $F^1$ can be readily inserted into or withdrawn from the said slots. Secured externally to each of the trunnion plates E is a spring stop $E^6$ carrying an inwardly projecting locking stud $E^7$ which lies in alignment with part of the associated bayonet slots $E^5$, the spring stops $E^6$ tending to flex outwards so as to bear against the adjacent inner surfaces of two side plates $E^8$ secured at $E^9$ to the under surface of the cover plate $A^2$. Thus, with the supporting frame E, $E^1$ in its lowered position as shown in Figure 4, that is to say so that the supporting frame and roll $F^1$ extend downwards through an opening $A^3$ in the cover plate $A^2$ and lie within the base A, the spring stops $E^6$ are flexed resiliently inwards whereby the studs $E^7$ extend into the bayonet slots $E^5$ and thus act as stops to prevent unintentional withdrawal of the trunnions $F^3$ from the slots $E^5$. When, however, the supporting frame E, $E^1$ is swung upwards about the pivot $E^2$ and out through the opening $A^3$, the spring stops $E^6$, on emerging from the opening $A^3$, flex outwards thus withdrawing the studs $E^7$ from the bayonet slots $E^5$ so that the spindle $F^2$ for the supply roll $F^1$ can be withdrawn upwards through the said slots. Since the spring stops $E^6$ are flexed outwards beyond the limits of the opening $A^3$, the supporting frame E, $E^1$ can be held in this withdrawn position by the lower corners of the stops $E^6$ resting on opposite margins of the opening $A^3$.

Mounted on a vertical support approximately midway in the length of the base A is one element G (hereinafter referred to as the "first" element) of a guide or gate for the flexible strip F. The element G is in the form of an arcuate trough or cradle, as shown in Figure 6, and is carried at the upper end of a plate $G^1$ having vertical slots $G^2$ through which extend studs $G^3$ in screwthreaded engagement with sockets formed in the bracket $E^3$. The lower end of the plate $G^1$ is provided with a post $G^4$ connected to the lower end of a spring $G^5$ whose upper end is anchored to the cover plate $A^2$. Thus, the concave or first guide element G is urged vertically upwards through one end of the opening $A^3$ in the cover plate $A^2$ by the spring $G^5$.

A carrier H arranged above the cover plate $A^2$ is provided with two lugs $H^1$ pivotally connected to the hinge pin $B^1$ and extending freely through vertical slots in the lid B. The carrier H constitutes the mounting for a moving-coil pen unit K whose coil (not shown) is connected to a pen spindle $K^1$ journalled at its outer end in a frame and connected to the pen $K^2$ through a U-shaped flexible support $K^3$. In this respect, any of the pen supports described in the specification referred to above may be employed. The frame H and the pen unit K—$K^2$ carried thereby are thus movable about the hinge pin $B^1$ independently of the lid or cover B. The carrier H, which is provided on opposite sides with feet $H^2$ resting on the upper surface of the cover plate $A^2$, as shown in Figure 2, has an arm $H^3$ whose free end supports the convex or "second" element L of the guide or gate. The element L corresponds in curvature to the concavity of the first guide element G so that when the two elements L and G are in cooperation, as shown in Figure 6, an arcuate guide is formed whose curvature is approximately coaxial with the main axis X—X of oscillation of the pen $K^2$. The second or convex guide element L is chamfered as shown at $L^1$ so as to permit the pen point to contact the paper strip just in front of the leading edge $L^2$ of the element L. Mounted on the upper surface of the arm $H^3$ is an angle plate $H^4$ having a slot $H^5$ through which the pen $K^2$ freely extends. The lower edge of the slot $H^5$ has two raised portions $H^6$ so that if the pen oscillates beyond a given angular distance in either direction the corresponding raised portion $H^6$ lifts the pen from the paper strip F so that if the pen point passes beyond the longitudinal edge of the strip, the said point will not catch in the edge of the strip on the return movement of the pen.

Arranged in the upper wall of the lid B is a button $B^2$ which bears against one end of a spring latch $B^3$ whose other end cooperates with a notch $B^4$ formed in the casing of the pen unit K. When the lid B is in the closed position there is a small amount of lost motion available between the end of the spring latch $B^3$ and the adjacent wall of the notch $B^4$, that is to say so that the lid B can execute a preliminary opening movement before the latch $B^3$ abuts against the adjacent wall of the notch $B^4$, for the purpose described below. The lid B, which is furnished with a transparent window $B^5$, carries at its free end a longitudinally operable latch M provided with notches $M^1$ for cooperating with a spring-loaded friction detent $M^2$. The latch M is provided at its outer end with an operating head $M^3$ whilst its inner end cooperates with a bar $M^3$ carried by the cover plate $A^2$ so that when the lid B is closed and the head $M^3$ is pressed inwards the lid is firmly locked in the closed position.

Attached to the under side of the cover plate $A^2$ are three switches, namely a master switch N controlled by a stud $N^1$ extending upwards through the cover plate $A^2$, and two subsidiary switches P and $P^1$ both controlled by a knob $P^2$. The switches N and P are electrically connected in series with each other and with the pen, whilst the switch $P^1$ is connected in series with the driving motor C so that when the lid B is fully closed a downwardly projecting leg $N^2$ within the lid B acts on the stud $N^1$ to close the master switch N, thereby establishing the circuit for the supply of power to the pen from an external source through a plug coupling R when the knob $P^2$ is turned to close the switches P and $P^1$.

Assuming first that the lid B is in its open position and that it is desired to charge the apparatus with a roll $F^1$, both the pen unit K—$K^2$ and the second or convex guide element L will be swung away and clear of the base A. The angular distance through which the lid and pen unit can be swung into the open position is limited by a stud $A^4$ carried by one of the lugs $H^1$ of the cover B engaging a stop plate $A^6$ and turning this plate in the counterclockwise direction, as viewed in Figure 2, until a nose $A^7$ on the plate $A^6$ engages a fixed part of the base. The frame E, $E^1$ is now manually swung upwards out of the opening $A^3$ so that the two spring stops $E^6$ flex outwards until they pass beyond the upper surface of the cover plate $A^2$. The locking studs $E^7$ having thus been automatically withdrawn from the bayonet slots $E^5$, the trunnions $F^3$ of a spindle $F^2$ carrying a fresh roll of paper $F^1$ can be inserted in the bayonet slots $E^5$ and the end of the paper strip F carried round the roller $E^4$ whereupon the spring stops $E^6$ can be pressed inwards so that they will enter the opening $A^3$ and allow the support E, $E^1$, together with the supply roll $F^1$ carried thereby, to be lowered into the base A. Since the studs $E^7$ now lie in the bayonet slots $E^5$, unintentional displacement of the spindle $F^2$ from the slots $E^5$ will be prevented. The end of the recording strip F is now drawn over the first or concave guide element G carried by the base A and over the roller D so as to extend to one side of the base A. As the lid B is swung about the hinge pin $B^1$ from the open position the second or convex guide element L bears down upon the recording strip F towards the end of the closing movement, so that the strip F is arcuately flexed between the two guide elements G and L about an axis approximately coaxial with the main axis X—X of oscillation of the pen $K^2$. By reason of the lost motion available between the latch $B^3$ and the cooperating wall of the notch $B^4$, the pen unit K and the second or convex guide element L do not partake of the final part of the closing movement of the lid B, which final movement brings the spring-loaded idler roller $D^1$ on to the upper surface of the recording strip F which is thereby gripped between the idler roller $D^1$ and the roller D, the end of the strip emerging through a slot $B^6$ in the lid B. The strip F, on its way to the slot $B^6$, passes beneath two guide lips $A^8$ and is laterally guided by two cheeks $A^9$ on the upper face of the cover plate $A^2$. When, or immediately before, the lid B reaches its closed position the leg $N^2$ acts through the stud $N^1$ to close the master switch N whereby the pen circuit is established in readiness for energisation by operation of the knob $P^2$ so as to close the switch P and the motor switch $P^1$. The electric clock motor C now acts through the reduction gear $C^1$ to drive the roller D which draws the recording strip F from the supply roll $F^1$ and through the gate G, L at constant speed, this movement of the recording strip approximately parallel to the main axis of oscillation X—X constituting one coordinate to be recorded on the strip. Alternatively, the strip F may be driven in accordance with the movements of some portion of a machine or measuring instrument, coupling being effected either mechanically or, for example, by means of self-synchronising motors. The pen unit K is energised through terminals $K^4$ in accordance with the variable value to be recorded, that is to say the second coordinate, the value being thus recorded in rectangular coordinates on the strip F.

When it is desired to recharge the recorder or to examine the strip F within the apparatus, the head $M^3$ is withdrawn and the lid B is opened, thereby first opening the master switch N. Thus, when the lid B is initially raised the power is automatically cut off from the pen unit by the master switch N, thereby guarding against shock to the user from the power supply. As the upward movement of the lid B continues, the spring latch $B^3$ engages the wall of the notch $B^4$ and both the pen unit K—$K^2$ and the convex or second guide element L move with the lid B and are thus swung clear of the cover plate $A^2$. The support E, $E^1$ for the supply roll $F^1$ can now be swung out through the opening $A^3$ as described above. It will be apparent that by depressing the button $B^2$ the lid B can be raised alone, that is to say so as to leave the pen unit K, $K^2$, L in position over the strip F.

It has been found that if the pen $K^2$ is inclined to the surface of the paper F at an angle of between 45° and 50°, there is little, if any, tendency for the marking point of the pen to damage the paper or to suffer damage itself, even should the paper F be inadvertently moved in the reverse direction, that is to say to the left in Figure 2, through the gate G, L. If, however, in order to reduce the moment of inertia of the pen itself to the lowest practicable value, the angle of inclination of the pen were somewhat more obtuse, there would be some danger that the tip of the pen might penetrate the strip F and possibly cause damage to the pen and/or strip. Moreover, when the latch $B^3$ is operative and the lid is reclosed, thus restoring the pen $K^2$ to the operative position, the pen point might penetrate and damage the strip or suffer damage itself. With a view to meeting this difficulty, the angle plate $H^4$, instead of being rigidly secured to the arm $H^3$, may be arranged as shown in Figure 9. In this arrangement, the angle plate $H^4$ is pivotally connected at S to the carrier H and is urged towards a limiting stop $K^5$ on the pen frame $K^1$ by a loading spring $S^1$. Alternatively, as shown in Figure 10, the plate $H^4$ may cooperate with a biassing spring $S^2$ and an adjustable stop $S^3$ on opposite sides of a pivot $S^4$ on the carrier H. The angle plate $H^4$ (Figures 9 or 10) also cooperates with a stop $N^3$ provided on the leg $N^2$. With this arrangement, when the lid is in its fully closed position the stop $N^3$ bears down on the angle plate $H^4$ against the action of the loading spring $S^1$ or $S^2$, whereas when the latch M is released and the lid B is raised, the initial lost motion available between the latch $B^3$ and the cooperating wall of the notch $B^4$ will permit the spring $S^1$ or $S^2$ to lift the angle plate $H^4$ and thus raise the pen point from the paper F before the pen unit commences to travel upwards with the lid B. Similarly, when the lid B is reclosed, the final portion of this closing movement will cause the guide element L first to be restored to its operative position in cooperation with the first or concave element G, after which the abutment $N^3$ will engage the angle plate $H^4$ and move this downwards so as to permit the pen $K^2$ to be lowered on to the paper F.

For the purpose of self-alignment of the element G, an appreciable lateral movement of the plate $G^1$ can take place so that the element G can adjust itself relatively to the cooperating element L.

With a view to permitting rapid manual withdrawal of the recording strip F from the apparatus while the lid B is in the closed position, the finger button $C^3$ is depressed so as to disconnect the drive $C^4$ from the feed roller D while the strip is being drawn through the slot $B^6$ manually.

What I claim as my invention and desire to secure by Letters Patent is:

1. Recording apparatus comprising a base portion, a marker unit including a marker and means for oscillating the marker about a main axis in accordance with one of two coordinates to be recorded by the marker, a hinge connecting the marker unit to the base portion, means whereby a flexible chart is moved relatively to the marker in accordance with the other coordinate to be recorded and in a direction parallel to the said main axis, two cooperating and mutually separable arcuate guide elements together constituting a device for flexing the chart about an axis approximately coaxial with the main axis of oscillation of the marker which cooperates with the concave surface of the chart, means whereby one of such guide elements is carried by the base portion, and means for mounting the second arcuate guide element on the marker unit with its axis approximately coaxial with the main marker axis whereby such element can be moved together with the marker unit about the hinge away from the first guide element to release the chart or towards the first guide element to effect flexing of the chart.

2. Recording apparatus comprising a base portion, a marker unit including a marker and means for oscillating the marker about a main axis in accordance with one of two coordinates to be recorded by the marker, an operable lid, coaxial hinges respectively connecting the marker unit and the lid to the base portion, a support normally housed within the base portion for a flexible chart supply roll, means whereby the flexible chart from the supply roll is moved relatively to the marker in accordance with the second of the two coordinates to be recorded and in a direction parallel to the said main axis, two cooperating and mutually separable arcuate guide elements together constituting a device for flexing the chart about an axis approximately coaxial with the main axis of oscillation of the marker which cooperates with the concave surface of the chart, means whereby one of such guide elements is resiliently carried by the base portion, means for mounting the second arcuate guide element on the marker unit with its axis approximately coaxial with the main marker axis whereby such element can be moved together with the marker unit about the hinge away from the first guide element to release the chart or towards the first guide element to effect flexing the chart, the resilient mounting of the first guide element ensuring proper alignment of the two elements when they are in engagement with one another, means for coupling the marker unit to the lid whereby the marker unit can be moved away from the base portion about the hinge by opening the lid, and means for pivotally connecting the supply roll support to the base portion whereby when the marker unit has been moved away from the base portion the support can be swung out of the base portion to facilitate replacement of the supply roll.

3. Recording apparatus as claimed in claim 2, having a marker control member movably carried by marker unit and cooperating with the marker, a spring tending to urge such member into engagement with the marker to retract the marker from the chart, and a projection on the lid engaging with such member to hold it in its inoperative position when the lid is closed, the coupling means between the lid and the marker unit having lost motion whereby the initial opening movement of the lid causes the pen to be retracted from the chart before the marker unit begins to move.

4. Recording apparatus comprising a base portion, a marker unit including a marker and means for oscillating the marker about a main axis in accordance with one of two coordinates to be recorded by the marker, a hinge connecting the marker to the base portion, an operable lid hinged to the base portion, means whereby a flexible chart is moved relatively to the marker in a direction parallel to the said main axis in accordance with the second of the two coordinates to be recorded, two cooperating and mutually separable arcuate guide elements together constituting a device for flexing the chart about an axis approximately coaxial with the main axis of oscillation of the marker which cooperates with the concave surface of the chart, means whereby one of such guide elements is carried by the base portion, means for mounting the second arcuate guide element on the marker unit with its axis approximately coaxial with the main marker axis whereby such element can be moved together with the marker unit about the hinge away from the first guide element to release the chart or towards the first guide element to effect flexing of the chart, and a releasable coupling between the lid and the marker unit whereby when the coupling is engaged the opening of the lid will cause the marker unit to move away from the base portion while when the coupling is released the lid can be opened independently of the marker unit.

5. Recording apparatus as claimed in claim 4, having a marker control member movably carried by marker unit and cooperating with the marker, a spring tending to urge such member into engagement with the marker to retract the marker from the chart, and a projection on the lid engaging with such member to hold it in its inoperative position when the lid is closed, the coupling means between the lid and the marker unit having lost motion whereby the initial opening movement of the lid causes the pen to be retracted from the chart before the marker unit begins to move.

References Cited in the file of this patent

UNITED STATES PATENTS

| | | |
|---|---|---|
| 1,089,744 | Brown | Mar. 10, 1914 |
| 1,316,657 | White et al. | Sept. 23, 1919 |
| 1,880,008 | Angus | Sept. 27, 1932 |
| 1,886,844 | Spitzglass | Nov. 8, 1932 |
| 2,059,879 | Pierre | Nov. 3, 1936 |
| 2,077,242 | Pierre | Apr. 13, 1937 |
| 2,412,639 | Traugott | Dec. 17, 1946 |
| 2,524,564 | Gorham | Oct. 3, 1950 |

FOREIGN PATENTS

| | | |
|---|---|---|
| 612,619 | Great Britain | Nov. 16, 1948 |
| 613,102 | Great Britain | Nov. 22, 1948 |